UNITED STATES PATENT OFFICE.

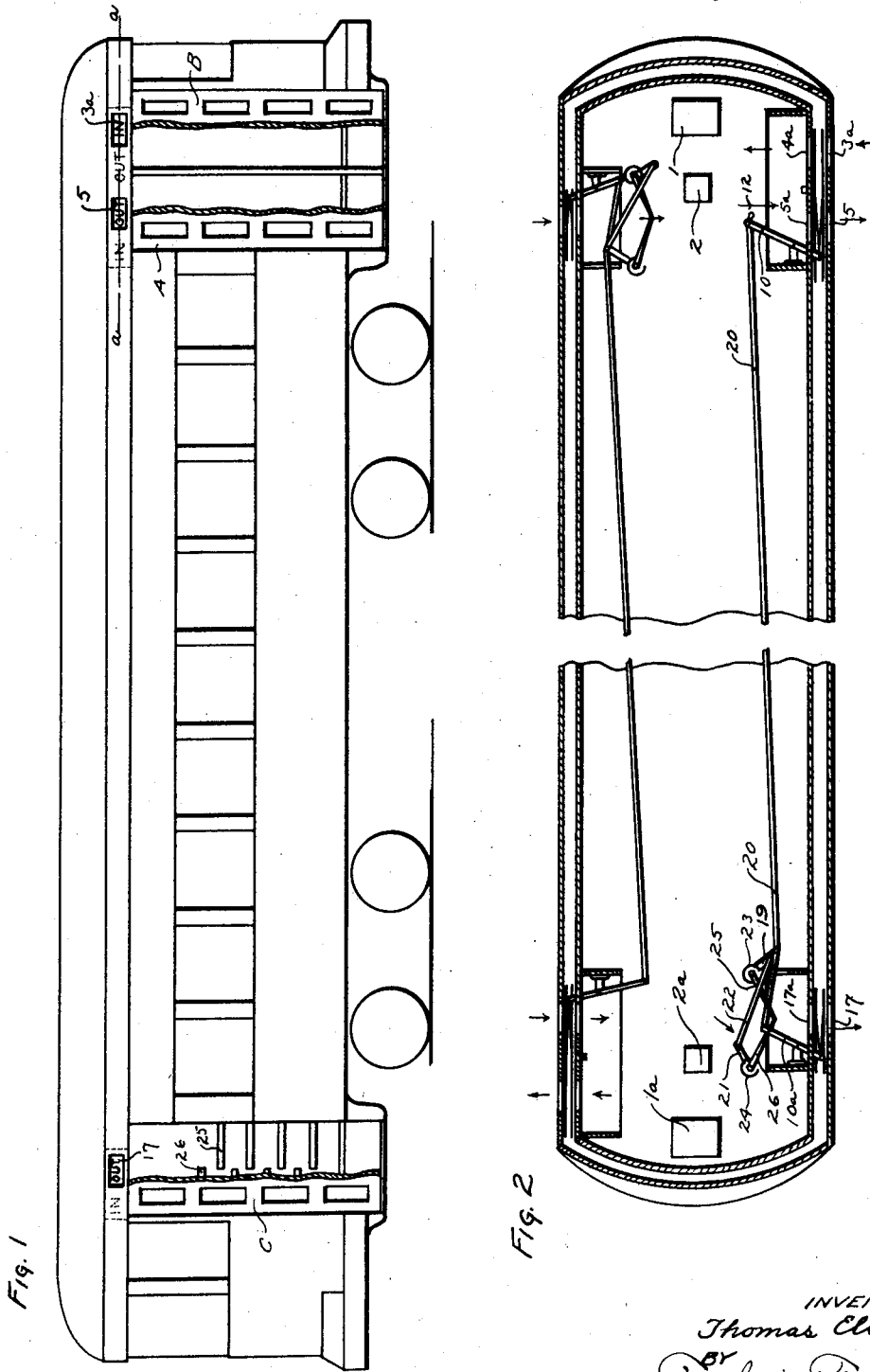

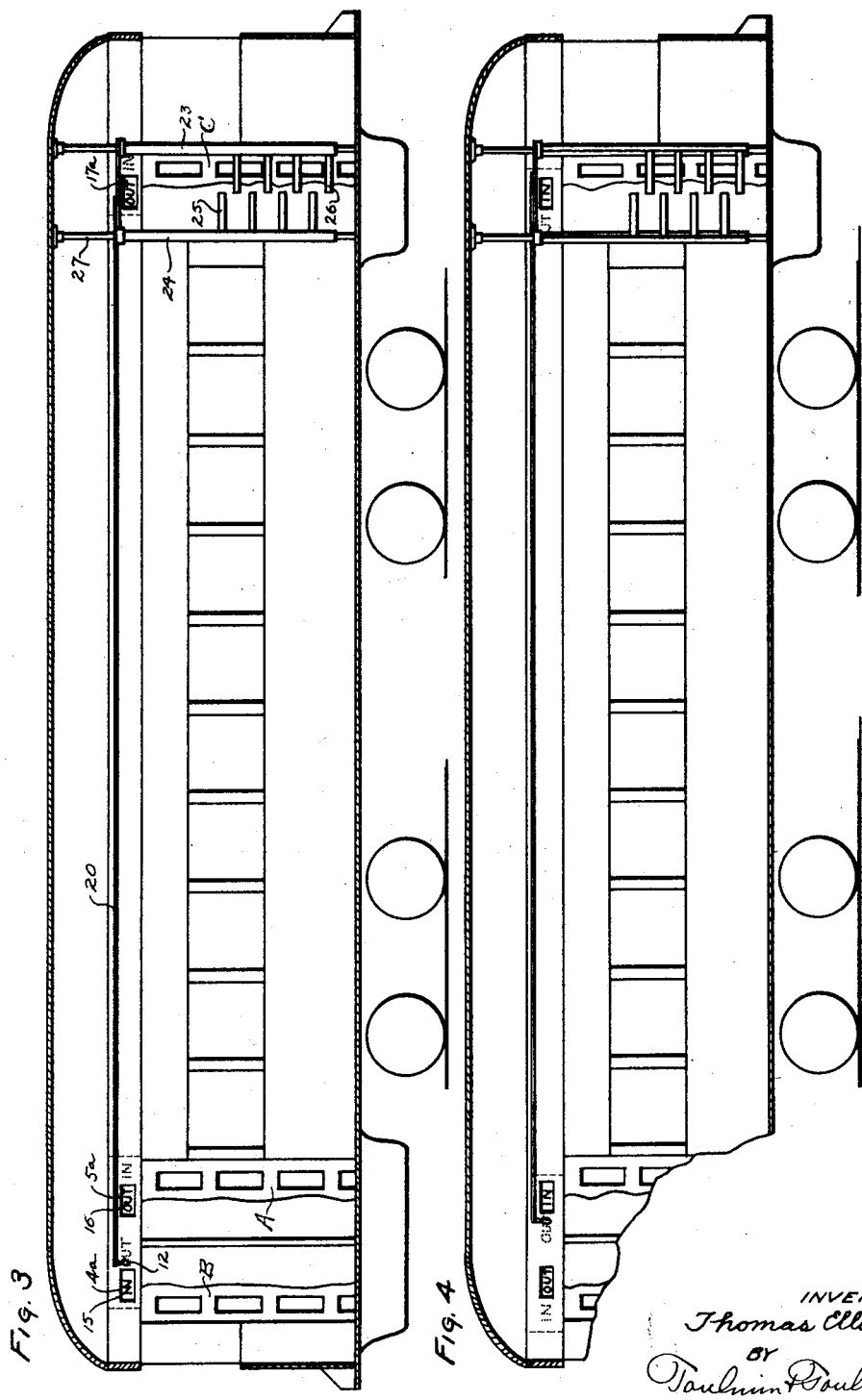

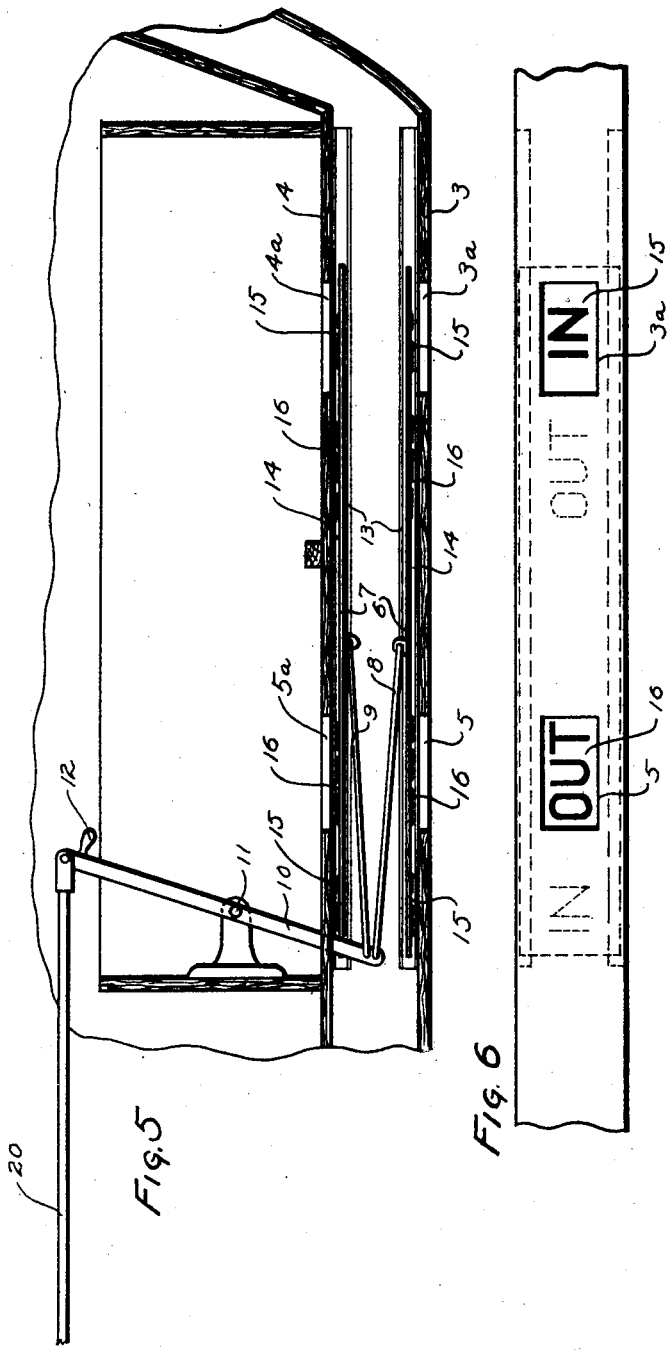

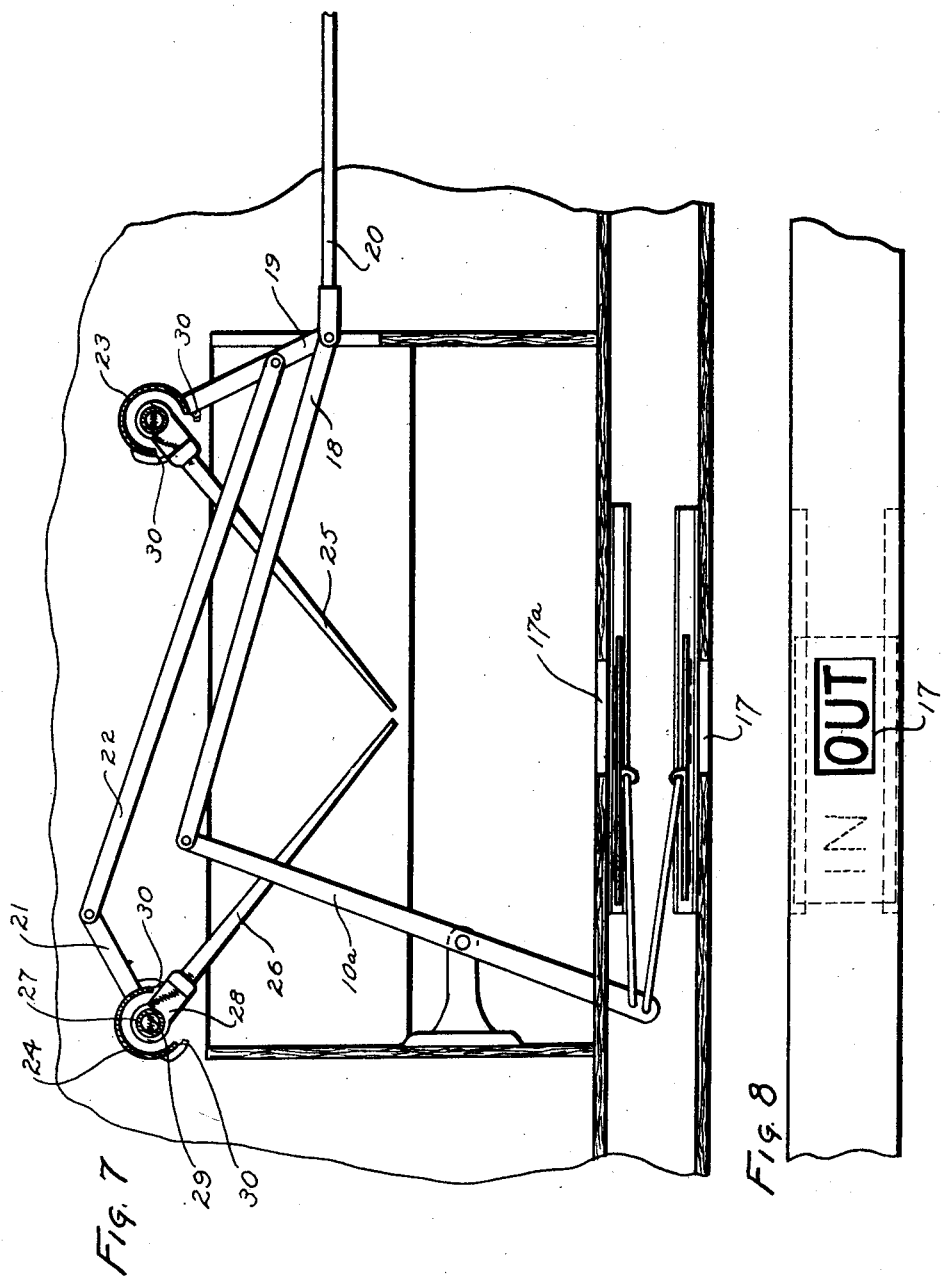

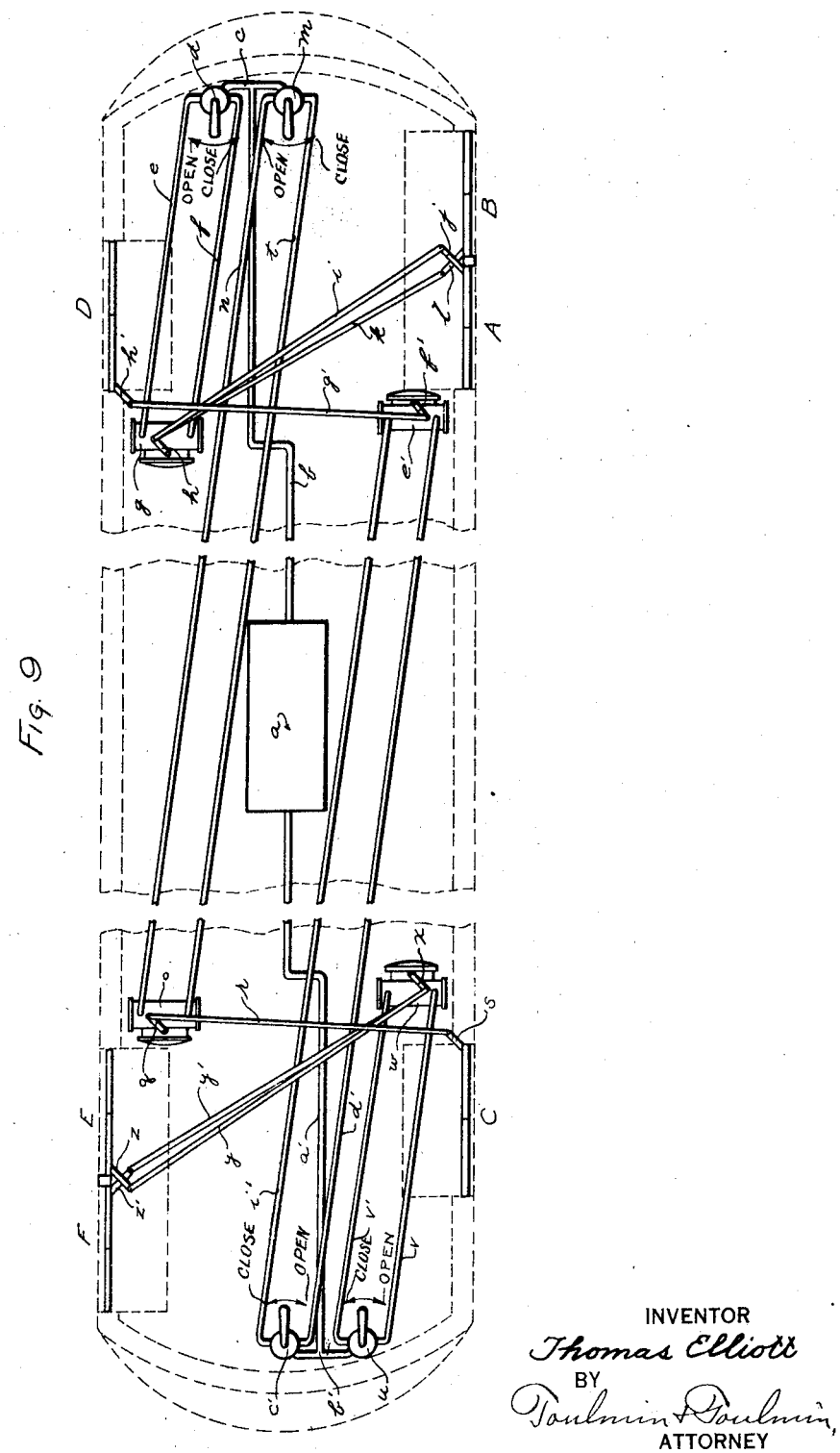

THOMAS ELLIOTT, OF CINCINNATI, OHIO, ASSIGNOR TO THE CINCINNATI CAR COMPANY, OF CINCINNATI, OHIO, A CORPORATION OF OHIO.

DOUBLE-ENDED RAILWAY-CAR.

1,388,416.      Specification of Letters Patent.     Patented Aug. 23, 1921.

Application filed March 21, 1921. Serial No. 454,030.

*To all whom it may concern:*

Be it known that I, THOMAS ELLIOTT, a citizen of the United States, residing at Cincinnati, in the county of Hamilton and State of Ohio, have invented certain new and useful Improvements in Double-Ended Railway-Cars, of which the following is a specification, reference being had therein to the accompanying drawings.

This invention relates to double-ended railway cars, particularly of the class used on lines, one terminal of which is in the crowded or congested part of the city and the other terminal in a suburban or less congested or crowded district.

The general objects of my invention are:

(1) To provide a one-man double-ended or two way car to be used under the aforesaid conditions with a double system of signs and doorway controls or gates arranged and operated in a manner to permit of one side of the car being used on the system of "pay as you enter," as when leaving a suburban district or locality where the traffic is uncongested and scarce, and to permit the other side of the car being used as a "pay as you leave" car, as when the car leaves a terminal where conditions of traffic are crowded. In this way, when the signs, doors and doorway controls or gates on one side of the car are properly set passengers in a suburban district or at non-congested points may enter the car on that side and pay as they do so and leave it on that side without the interruption of paying their fares when they are in the crowded and congested districts and terminal, or vice versa, while in the crowded district or terminal they may enter the car on the other side of it and later pay their fares as they leave that side, when they get into the uncrowded or suburban localities, at which places there is more time and less confusion, giving opportunity to pay as they leave.

(2) To provide a car with a double system of signs and doorway controls or gates, one system on one side of the car and the other system on the other side, the signs on either side being adjustable to indicate to passengers, both off the car and about to board it, and on the car and desiring to leave it, which doorway to use for entrance and which to use for exit; and the controls or gates being adjustable to permit the passengers to enter or to exit at a doorway remote from one man or person operating the car.

(3) To combine with said double system of signs and controls or gates, suitable doors by which the entrance and exit of passengers on either side of the car may be controlled in accordance with the designation "In" or "Out" displayed by the signs on the outside and inside of both sides of the car, such doors being located both in the doorway near the operator or motorman and in the doorway remote from him or near the other end of the car, the doors on one side of the car being opened and closed as required for the passengers entering and leaving that side of the car and the doors on the other side being opened and closed as required only when the passengers are entering and leaving at that side.

From these observations it will be understood that this present invention is based on what I may call this double system of signs and doorway controls, while my companion application filed of even date herewith, Ser. No. 454,029 sets forth my other invention based on a single system of signs and doorway controls—the term "double" referring to the signs and doorway controls being applied to both sides of a car and the term "single system" being applied to the signs and doorway controls when applied to one side of a car.

These several objects I carry into practical effect by the form of my invention illustrated herein.

In the accompanying drawings:

Figure 1 is a side elevation of a car embodying my invention;

Fig. 2 is a plan view of such a car showing the general arrangement;

Fig. 3 is a longitudinal, sectional view showing the interior of the car with the signs, doors and doorway controls set as in Fig. 1;

Fig. 4 is a like view showing the signs, doors and doorway controls as in Fig. 1, except that the same legends "In" and "Out" shown in dotted lines in Fig. 1 are shown in full lines;

Fig. 5 is an enlarged partial plan and partial sectional view on the line *a—a* of Fig. 1 more clearly showing the sign mechanism and sight openings;

Fig. 6 is an enlarged side elevation of the upper part of the car and the signs in a position corresponding to that in Fig. 5;

Fig. 7 is an enlarged plan view and partial section of the doorway controls or gates and the sign slides and adjacent parts of the car;

Fig. 8 is a side elevation of the upper part of the car and the signs in the position shown in Fig. 7; and Fig. 9 is a view showing the front and rear doors and the mechanism to operate them from suitable levers or cranks in reach of the motorman, such doors and mechanism being applied in use to both sides of the car.

I will first describe my invention with reference to its use on cars on the "pay as you enter" system and then will later set forth its use on the "pay as you leave" system and will finally refer to the detail construction of the mechanism employed in carrying out the use of cars on both of these systems.

In Fig. 1 the signs, doors and doorway controls are set for using the car on the "pay as you enter" system, the mode of use when boarding the car in a suburban or uncongested district.

The signs, doors and doorway controls are likewise set on the lower half of Fig. 2 for use on the "pay as you enter" system, while on the upper half of Fig. 2 they are set for use on the "pay as you leave" system, in which case you would enter in the crowded or congested districts and pay as you leave in the suburban or uncrowded districts.

Thus, referring to Fig. 1 and to the lower side of Fig. 2 it will be understood that the motorman is at the station indicated 1, (Fig. 2), which is now the front of the car; and that the word "In" over the front doorway, (Fig. 1) indicates that the passengers are to enter there. Assume this to be in a suburban or uncrowded district. As they pass in they will pay their fare at the box designated 2. When they leave they will do so by the now rear doorway where the controls or gates are set outward, as will presently be described, so that the passengers may readily push through the gates and leave the car. Over this doorway the sign will indicate "Out," as shown in Fig. 1. They will also in this case leave by the front doorway over which the sign "Out" appears, as in Fig. 1.

Assume now that the car has reached the terminal in the congested district of a city and is to return. In this case the motorman will change his position to the other end and stand at 1$^a$ while the fare box to be now used is at 2$^a$, being the same box transferred to this point or another box, as may be desired in practice. In this case the passengers will enter at the rear door where the sign will read "In" and the controls will stand inward and can be pushed apart as the passengers enter. And in this case they will also enter by one of the front doorways, the one over which the word "In" will then appear. When they leave the car they will pay at the box 2$^a$ which is near the then position 1$^a$ of the motorman.

It is further to be understood that the signs are such that they display on the inside of the car the same legends that they display on the outside. See, for instance, Fig. 1 in comparison with Fig. 3, the latter being an inside view of the car. Observe that in both figures the word "In" and the word "Out" appear over the double doorway, while the word "Out" appears over the single doorway. Then when the signs in Fig. 1 are adjusted so that "Out" now in dotted lines shall appear where "In" appears and when "In" will appear where "Out" now appears, over the double doors, and likewise when they are adjusted so that "In" will appear instead of "Out" over the single door, the signs on the inside will appear as in Fig. 4, which is another inside view. Suitable doors A, B, C, D, E and F are provided at the respective doorways.

I will now refer to the construction and arrangement of the signs and in doing so will describe the same with reference to one side of the car, as exactly the same mechanism is duplicated at the other side.

It will be convenient to observe Figs. 5 and 6 as they are on a larger scale and correspond with the position of the parts as shown on the lower side of Fig. 2, at the right. The outer wall 3 of the car body, usually called the sign board, is slotted at 3$^a$ to form a sight opening, while the inner wall 4 is correspondingly slotted at 4$^a$ to form a sight opening. These walls are also slotted to form the outer sight opening 5 and the inner sight opening 5$^a$. All of these sight openings are over the double doorway, as seen in Fig. 1. The construction is the same at both ends of the car, but the double doorways are on opposite sides, as best shown in Fig. 2.

Inside of these sight openings 3$^a$, 4$^a$ and 5 and 5$^a$ are mounted the signs in the form of slides 6 and 7 connected, respectively, to rods or links 8 and 9, both of which are attached to a lever 10 pivoted at 11 to a bracket secured to a convenient part of the car. This lever is under the control of the motorman, as by means of a hand piece 12.

The sign slides are sustained in the guides 13 and 14 secured to the inner and outer walls 3 and 4 of the car side. At the points 15 the signs are inscribed with the word "In" and at the points 16 with the word "Out" so positioned that the word "In" will appear opposite the sight openings 3$^a$ and 4$^a$, while the word "Out" will appear through the sight openings 5 and 5$^a$, as indicated in Figs. 1 and 5 and while the word "Out" will appear through the sight openings 17 and 17ª at the other end of the car, as shown in Fig. 7. In these positions of the sign slides the words "Out" and "In" are out of view at one end, as shown in Fig. 1, and the word "In" is out of view at the other end. Whatever is seen on the signs on the outside is seen likewise on the signs on the inside of the car. For convenience and clearness the above description has reference to the positions and display shown in Fig. 1, in the lower part of Fig. 2 and in Figs. 5 and 7. Precisely the same construction, arrangement and operation apply to the other side of the car, as in the upper part of Fig. 2, where that side is being used in operating under the "pay as you leave" system.

This brings me to a description of the doorway controls or gates which I will make general in this specification because this mechanism is fully illustrated and described in detail in my copending application of even date herewith, Ser. No. 454,029, referred to above, and because also this doorway control or gate mechanism is made the subject of another copending application filed March 21st, 1921, Ser. No. 454,031, where it is set forth and claimed per se, as the subject matter of the invention.

With this explanation I would observe that one of the sign levers, that shown at 10ª, Figs. 2 and 7, is connected by a link 18 to a crank arm 19 and an operating rod 20 which runs to the other sign lever. The arm 19 and a companion arm 21 are interconnected by a link 22 so that they simultaneously adjust the sleeves 23 and 24 of the gate or control mechanism to position the sleeves so that the arms 25 and 26 stand either in the position for exit of the passengers, as in the lower part of Fig. 2 and in Fig. 7, or in the position for the entrance of passengers, as shown in the upper part of Fig. 2.

Within each of the sleeves 24 I place a stationary upright 27 on each of which is mounted a series of brackets 28 each carrying an arm 25 or 26. These brackets can partially rotate on the uprights so as to permit the arms to be swung apart as passengers enter the angle they form and press against them. A spring 29 connects each bracket with its upright, so that while the arms will yield to the passengers, they will be returned by the springs to their normal or set position. Stops 30 are carried by the sleeves 24 to limit the movements of the arms.

It will now be seen that by reason of my invention a two way or double-ended car may be operated by one man or motorman, that he may easily and readily control the entrance and exit of the passengers and may enable them to pay as they enter in suburban or uncongested districts so that they may leave the car in crowded districts without the delay occasioned by paying at that time, or that they may enter the car in crowded districts without delaying to pay at that time, but may pay as they leave in the less crowded districts; and that under all these conditions the motorman has the passengers under his close and immediate observation at the important time of paying their fares; and that he may do this at either end of the car according to which end is for the time acting as the front of the car.

Thus it will be seen that this car is a double-ended one-man car with one set of doorways, one set of signs, one set of doors and a doorway control on one side and another set of doorways, another set of signs, another set of doors and another doorway control on the other side, and also two sets of operating mechanisms, one set for the instrumentalities on one side of the car and another set for the instrumentalities on the other side of the car.

And it will further be seen that by my system of signs I exhibit on one side of the car at one doorway the legends "In" and "Out" and at the other doorway the legend "Out" or vice versa, and at the other side of the car I likewise exhibit like legends but with the doorway where two legends are exhibited diagonally changed in position, and the doors where one legend is exhibited also likewise diagonally changed in position.

I have spoken of the doors being operated for the entrance and exit of passengers. Any form of mechanism for this purpose may be used. In Fig. 9 I have illustrated one form of such mechanism operable from where the motorman stands. This figure is in the nature of a diagram, a detail description of which is as follows:—

An air pressure tank $a$ connects by a pipe $b$ a cross branch $c$, a valve $d$ and pipes $e$ and $f$ with an air engine $g$ whose piston (not shown) operates a crank arm $h$ to which are connected a pitman $i$ attached to a crank arm $j$ connected with the door A; and a pitman $k$ connected by a crank arm $l$ with the door B.

By turing the handle of the valve $d$ to a position near the word "Open" air will be admitted from the tank $a$ to the engine $g$ and the doors A and B will be opened. By turning the valve handle to the position indicated by the word "Close" air will be admitted to the other end of the engine $g$ and the doors A and B will be closed.

Standing at or near the same place the motorman may open and close the door C on the same side of the car by turning the handle of the valve $m$ to a position near the word "Open" when the air will pass from the branch pipe $c$ through the valve and through the pipe $n$ into the engine $o$ and operate the contained piston to swing the crank $q$ and through the pitman rod $r$ actuate the crank arm $s$ connected with the door C and open the door. By swinging the handle of the valve $m$ to near the word "Close" the air will pass through the pipe $t$ and enter the other end of the engine $o$ and close the door C.

Now to open and control the doors D, E and F on the other side of the car when the motorman is standing at the left hand end, as viewed in Fig. 9, he will turn the handle of the valve $u$ to near the point marked "Open" when air will flow from the tank $a$ through the pipe $a'$, the branch pipe $b'$, the valve $u$ and the pipe $v$ into the engine $w$ which will actuate the piston to turn the crank arm $x$ and push on the rod $y$ which through the arm $z$ will open the door E and likewise push on the rod $y'$ which through the arm $z'$ will open the door F.

When the handle of the valve $u$ is turned to the position indicated by the word "Close" the air will pass from the valve $u$ through the pipe $v'$ and into the engine $w$ and thereby close the doors E and F. To operate the remote door D the motorman will turn the handle of the valve $c'$ to the point indicated by the word "Open" which will cause air to flow through the pipe $d'$ to the engine $e'$ to actuate the piston to move the crank $f'$ and push the rod $g'$, which through the arm $h'$ will open the door D.

To close this door the motorman will present the handle of the valve $c'$ near the point indicated by the word "Close" which will permit the air to pass through the pipe $i'$ to the other end of the engine $e'$ and cause the piston and crank arm $f'$ to pull on the rod $g'$ and through the arm $h'$ close the door D.

The mechanism here described for these several purposes is illustrative only and, while perfectly feasible, may be modified or be dispensed with and other mechanism employed for like purposes.

Having thus fully described my invention, what I claim as new and desire to secure by Letters Patent, is:—

1. A double-ended one-man car having front and rear doorways at each side thereof, and sign mechanism for each of said doorways, the signs on one side adapted to simultaneously exhibit an entrance legend at one doorway and an exit legend at the other, and the signs on the other side adapted to simultaneously exhibit an entrance legend at one doorway and an exit legend at the other, so that such car may be used on the "pay as you enter" system when the entrance legend is exhibited at the front doorway and the exit legend at the rear doorway, or on the "pay as you leave" system when the entrance legend is at the rear doorway and the exit legend at the front doorway.

2. A double-ended one-man car having front and rear doorways at each side thereof, and sign mechanism for each of said doorways, the signs on one side adapted to simultaneously exhibit an entrance legend at one doorway and an exit legend at the other, and the signs on the other side adapted to simultaneously exhibit an entrance legend at one doorway and an exit legend at the other, such signs on one side being arranged to exhibit alternately "In" and "Out" at one doorway and "Out" and "In" at the other doorway and such signs on the other side being also arranged to alternatively exhibit "In" and "Out" at one doorway and "Out" and "In" at the other doorway so that such car may be used on the "pay as you enter" system when the entrance legend is exhibited at the front doorway and the exit legend at the rear doorway, or on the "pay as you leave" system when the entrance legend is at the rear doorway and the exit legend at the front doorway.

3. A double-ended one-man car having front and rear doorways at each side thereof, and sign mechanism for each of said doorways, the signs on one side adapted to simultaneously exhibit an entrance legend at one doorway and an exit legend at the other, and the signs on the other side adapted to simultaneously exhibit an entrance legend at one doorway and an exit legend at the other, so that such car may be used on the "pay as you enter" system when the entrance legend is exhibited at the front doorway and the exit legend at the rear doorway, or on the "pay as you leave" system when the entrance legend is at the rear doorway and the exit legend at the front doorway, doors for said doorways, a doorway control for one doorway on each side, and operating mechanism for said doors and controls.

4. A double-ended one-man car having front and rear doorways at each side thereof, and sign mechanism for each of said doorways, the signs on one side adapted to simultaneously exhibit an entrance legend at one doorway and an exit legend at the other, and the signs on the other side adapted to simultaneously exhibit an entrance legend at one doorway and an exit legend at the other, such signs on one side being arranged to exhibit alternatively "In" and "Out" at one doorway and "Out" and "In" at the other doorway and such signs on the other side being also arranged to alternatively exhibit "In" and "Out" at one doorway and "Out" and "In" at the other doorway so that such car may be used on the "pay as you enter" system when the entrance legend is exhibited at the front doorway and the exit legend at the rear doorway, or on the "pay as you leave" system when the entrance legend is at the rear doorway and the exit legend at the front doorway, doors for said doorways, a doorway control for one doorway on each side, and operating mechanism for said doors and controls.

5. A double-ended one-man car having front and rear doorways at each side thereof, sign slides having "In" and "Out" legends located adjacent the doorways on both sides of the car and adapted when in one position to exhibit "In" for the front doorway and "Out" for the rear doorway, or vice versa, mechanism to so operate said slides, doors for the doorways and a doorway control for the rear doorway on each side of the car and adapted to open outward for exit and inward for entrance, and mechanism for operating said doors and doorway controls.

6. A double-ended one-man car having double doorways diagonally placed at opposite sides of the car, double doors for each double doorway and single doorways diagonally placed at opposite sides of the car, a single door for each single doorway, and a doorway control for each single doorway adapted selectively to open for exit or for entrance, mechanism for operating said doors and doorway control on one side of the car from a common point, and mechanism for operating said doors and doorway control on the other side of the car from a common point.

7. A double-ended one-man car having double doorways diagonally placed at opposite sides of the car, double doors for each double doorway, and single doorways diagonally placed at opposite sides of the car, a single door for each single doorway, and a doorway control for each single doorway adapted to open for exit or for entrance, mechanism for operating said doors and doorway control on one side of the car from a common point, and mechanism for operating said doors and doorway control on the other side of the car from a common point, and sign slides adjacent each doorway and adapted to exhibit the legends "In" and "Out" for the double doorways and "Out" for the single doorway and alternatively to exhibit "Out" and "In" for the double doorways and "In" for the single doorways, and operating mechanism for said slides.

8. A double-ended one-man car having a front doorway and a rear doorway on each side thereof, of double signs for each doorway, each sign being adapted to exhibit its legend "In" and its legend "Out," according to its adjustment, to persons both outside and inside the car.

9. A double-ended one-man car having a double doorway on one side, a double doorway diagonally located on the other side, a single doorway on one side and a single doorway diagonally located on the other side, and sign slides for all of said doorways and sight openings on both sides of the car to exhibit the sign legends both from the outside and the inside of the car, the legends for the double doorways indicating "In" and "Out" or alternately "Out" and "In" and the legends for the single doorway indicating alternately "Out" or "In."

10. A double-ended one-man car having legend sight openings in both sides thereof, some of said sight openings opening outward and some inward, a pair of sign slides for each side of the car, each pair of slides having legends exhibited outward and corresponding legends exhibited inward through the sight openings, respectively.

11. A double-ended one-man car having in each side thereof a pair of sight openings exhibiting outward and a pair of sight openings exhibiting inward, and sign slides at each side of the car mounted to slide back and forth past the adjacent sight openings and having entrance legends which show through the outer and inner sight openings when the slides are in one position and having exit legends which exhibit through the other sight openings when the slides are in another position, and mechanism to operate the slides on each side of the car.

12. A double-ended one-man car having a double doorway on each side at opposite ends and a single doorway on each side at opposite ends, double doors for said double doorways and single doors for said single doorways, and door controls also for said single doorways adapted to open for exit and for entrance, and mechanism for operating said doors and doorway controls from a common point.

13. A double-ended one-man car having a doorway on each side, one located near one end of the car and the other near the other end, a door for each of said doorways and a doorway control for each of them, the latter adapted selectively to open for exit and for entrance, and mechanism for operating the door and doorway control on one side and mechanism for operating the door and doorway control on the other side.

14. The combination, with a double-ended one-man car having a doorway at each side diagonally placed, of a door and a doorway control for each of said doors, each doorway control comprising members adjustable for exit or entrance and adapted to spring apart as passengers pass outward or inward.

15. The combination, with a double-ended one-man car having a doorway at each side, the doorways being diagonally placed, of a door and a doorway control for each of said doorways, each control comprising members and stops therefor, the members being adapted to swing apart as passengers pass in one direction and to oppose the entrance of passengers in the other direction, mechanism for each doorway control to adjust said members to positions to permit passengers to exit or enter, and other mechanism to operate each of said doors.

16. The combination, with a double-ended one-man car having a doorway at each side thereof diagonally placed, of a doorway control for each of said doorways, each control comprising swinging members, the members being adapted to be adjusted to swing apart as passengers exit or to be adjusted to swing apart as passengers enter.

17. A double-ended one-man car having on one side a double doorway and a single doorway and on the other side a single doorway and a double doorway, the single doorways being each opposite one of the double doorways, doors for all of said doorways, doorway controls for each single doorway, said controls being adapted to be adjusted for exit or entrance, mechanism to operate said doors and controls, sign slides for each doorway bearing outward and inward legends indicating entrance and exit, according to adjustment, mechanism for operating said sign slides, the car having sight openings to expose the legends from the outside and inside.

In testimony whereof, I affix my signature.

THOMAS ELLIOTT.